United States Patent [19]
Lindahl

[11] Patent Number: 5,362,189
[45] Date of Patent: Nov. 8, 1994

[54] BALE HANDLING CARRIER

[76] Inventor: Michael J. Lindahl, Rte. 1, Box 296, Stoddard, Wis. 54658

[21] Appl. No.: 91,174

[22] Filed: Jul. 13, 1993

[51] Int. Cl.⁵ .......................... A01D 87/12; B60P 1/02
[52] U.S. Cl. .................................. 414/24.5; 414/459; 414/495
[58] Field of Search .................. 414/24.5, 111, 459, 414/474, 495

[56] References Cited

U.S. PATENT DOCUMENTS

| | | | |
|---|---|---|---|
| 4,204,789 | 5/1980 | Parks, Jr. | 414/24.5 |
| 4,204,790 | 5/1980 | Baxter | 414/24.5 |
| 4,266,898 | 5/1981 | Jacobsen et al. | 414/24.5 |
| 4,396,330 | 8/1983 | Rozeboom | 414/24.5 |
| 4,537,548 | 8/1985 | Lockhart | 414/24.5 |
| 4,652,196 | 3/1987 | Woerman | 414/24.5 |
| 4,773,806 | 9/1988 | Beaulieu | 414/24.5 |
| 4,938,646 | 7/1990 | Elias et al. | 414/24.5 |
| 4,971,504 | 11/1990 | Klompien | 414/111 |
| 5,071,304 | 12/1991 | Godfrey | 414/111 |
| 5,074,733 | 12/1991 | Hennig | 414/459 X |

*Primary Examiner*—Michael S. Huppert
*Assistant Examiner*—Janice L. Krizek
*Attorney, Agent, or Firm*—Andrus, Sceales, Starke & Sawall

[57] ABSTRACT

A carrier for cylindrical bales of hay includes a rigid support structure for supporting a series of cylindrical bales in end-to-end relationship. Fluid power mechanisms are disposed on the support structure for moving the support structure upwardly and downwardly relative to the ground. A fluid control arrangement is accessibly mounted on the support structure and adapted for apportioning equally and automatically a flow of fluid to each of the fluid power mechanisms suck that the support structure is smoothly and evenly raised and lowered during handling of the cylindrical bales.

15 Claims, 3 Drawing Sheets

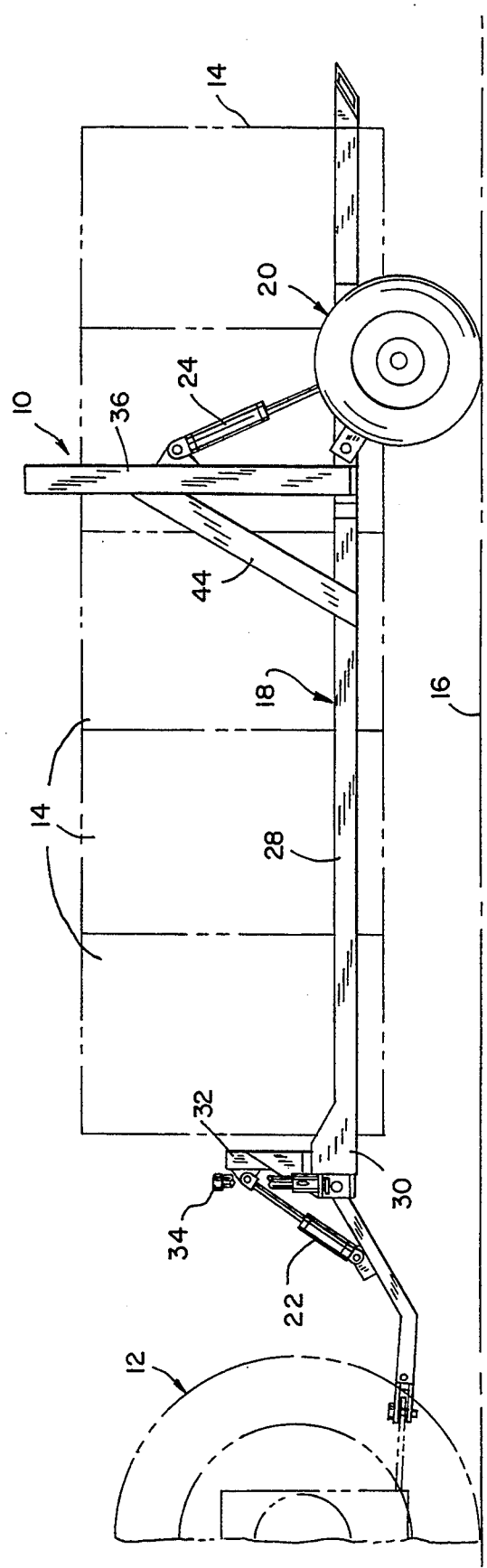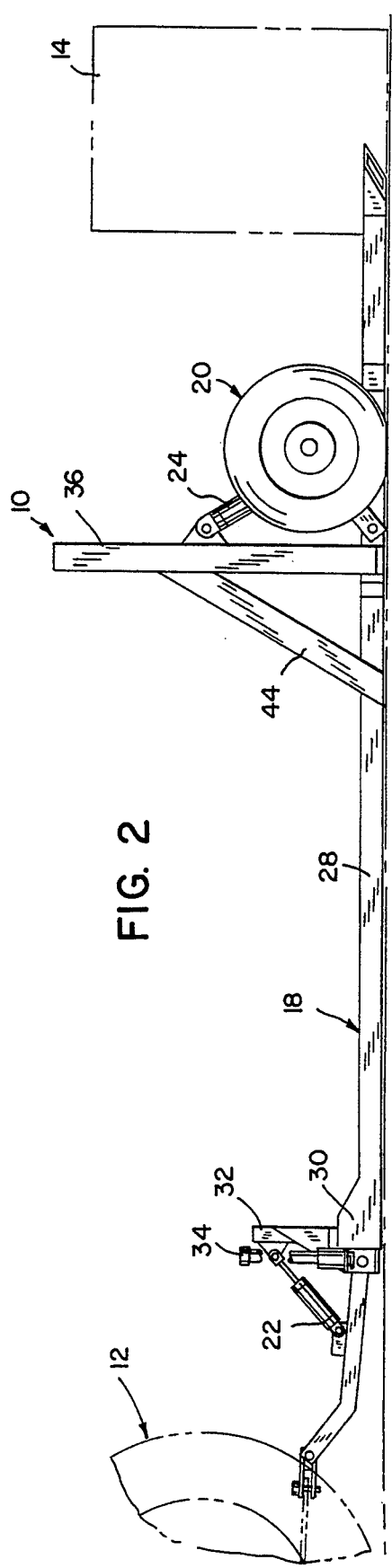

BALE HANDLING CARRIER

TECHNICAL FIELD

This invention relates generally to a carrier for handling round bales of hay and the like, and more particularly, pertains to a carrier adapted to be towed by a vehicle, such as a tractor, for retrieving, transporting, and discharging round bales of hay at a predetermined site.

BACKGROUND OF THE INVENTION

In recent years, automated hay baling equipment has been employed to form and bind bales of hay in a cylindrical or round shape. Such bales are relatively large and heavy, ranging in diameter from 4 feet to 8 feet and weighing anywhere from 800 lbs. to approximately 1500 lbs. These bales possess significant advantages over the more conventional rectangular-shaped bales. For example, a large, round or cylindrical hay bale may be the equivalent of at least 20 regular rectangular bales. Further, cylindrical bales can be stored outside for a prolonged period, if necessary, without suffering adverse consequences. Due to their round formation, these bales shed water, and as such, do not rot as rectangular bales do when left in the field. Generally, these round bales, after they are formed in the field, are left lying on their sides on the ground and subsequently, must be picked up and hauled away for storage and livestock feedings. Because of their overburdening size, however they are too large and heavy for being handled manually and typically require machine handling.

The agricultural art is replete with various types of powered equipment for handling and transporting round or cylindrical bales. Most of this equipment is characterized by a towing vehicle having a boom assembly comprising a pair of elongated bale-engaging booms supported on ground engaging wheels. The forward and rearward ends of the booms are hydraulically lowered with respect to the wheels and with respect to the ground so that the towing vehicle can be moved to back the rearward end of the booms along two sides of the cylindrical hay bale and under the curved sides thereof while the bale is resting on the ground, and whereby the booms can be hydraulically raised with respect to the ground and the wheels, so as to support the bale on the booms while being transported by the carrier. Each cylindrical bale is supported on the booms until the full capacity of the carrier is reached, at which time the towing vehicle may be driven to a place of discharge of the cylindrical bales and the booms may be hydraulically lowered and the vehicle pulled away from the cylindrical bales, leaving the bale disposed on the surface of the ground at a storage site. Carriers of this type are disclosed in U.S. Pat. No. 4,204,790 issued May 27, 1930 to Baxter, U.S. Pat. No. 4,266,898 issued May 12, 1981 to Jacobsen, et al, U.S. Pat. No. 4,652,196 issued Mar. 24, 1987 to Woerman, and U.S. Pat. No. 5,071,304 issued Dec. 10, 1991 to Godfrey.

Prior art bale lifting and transporting apparatus has been somewhat dependent on designs of certain telescopic lifting assemblies, location of pivot points for bale engaging members, and the control of hydraulic fluid used in certain hydraulic cylinders to actuate various carrier elements. Additional techniques for automatically manipulating and conveying selected bales beyond the realm of conventional agricultural trailer arrangements need to be considered.

Accordingly, it is desirable to provide an improved bale handling carrier having a simplified bale engaging arrangement which will ensure continuous, even, and safe loading and unloading of bales, irregardless of size or condition.

SUMMARY OF THE INVENTION

The present invention advantageously provides an improved bale handling and transporting carrier having a support structure design and fluid control arrangement for raising and lowering the support structure in a smooth, even and safe manner. The improved design is relatively simple and economical, and operates in conjunction with the fluid power source of its towing vehicle.

These and other advantages are realized in one aspect of the invention by a carrier adapted to be drawn over the ground for handling and transporting cylindrical bales of hay. The carrier includes a rigid support structure having a forward end adapted to be connected to a towing vehicle and a rearward end adapted to be engaged with cylindrical bales for supporting a series of cylindrical bales in end-to-end relationship substantially along the length of the support structure. The support structure also includes a generally U-shaped, inverted frame extending upwardly from the support structure. A wheel assembly is pivotally connected each side of the support structure adjacent the U-shaped frame, and a fluid power mechanism is disposed on each side of the support structure for moving the support structure upwardly and downwardly, relative to the wheel assemblies on the ground. A fluid control arrangement is accessibly mounted on the forward end of the support structure and is adapted for equally and automatically apportioning the flow of fluid to each of the power mechanisms such that the support structure is smoothly and evenly raised and lowered during handling of the cylindrical bales.

In a highly preferred embodiment, a further fluid power mechanism is disposed on the forward end of the support structure for raising and lowering the forward end thereof. The fluid control arrangement comprises an automatic equalizer valve, which is operatively connected with each of the fluid power mechanisms located on each side of the support structure and a manually controllable flow control valve, which is operatively connected with the further power mechanism located on the forward end of the support structure.

BRIEF DESCRIPTION OF THE DRAWINGS

The invention will become better understood by reference to the following detailed description of the preferred exemplary embodiment when read in conjunction with the appended drawing, wherein like numerals denote like elements and;

FIG. 1 is a view in side elevation showing a towing vehicle connected with a bale handling carrier embodying the present invention and supporting in phantom a line of end-to-end bales in an elevated position;

FIG. 2 is another view in the side elevation in the carrier shown in FIG. 1, in a lowered position prior to the loading of a first bale;

DETAILED DESCRIPTION OF THE PREFERRED EMBODIMENTS

Figure 3:
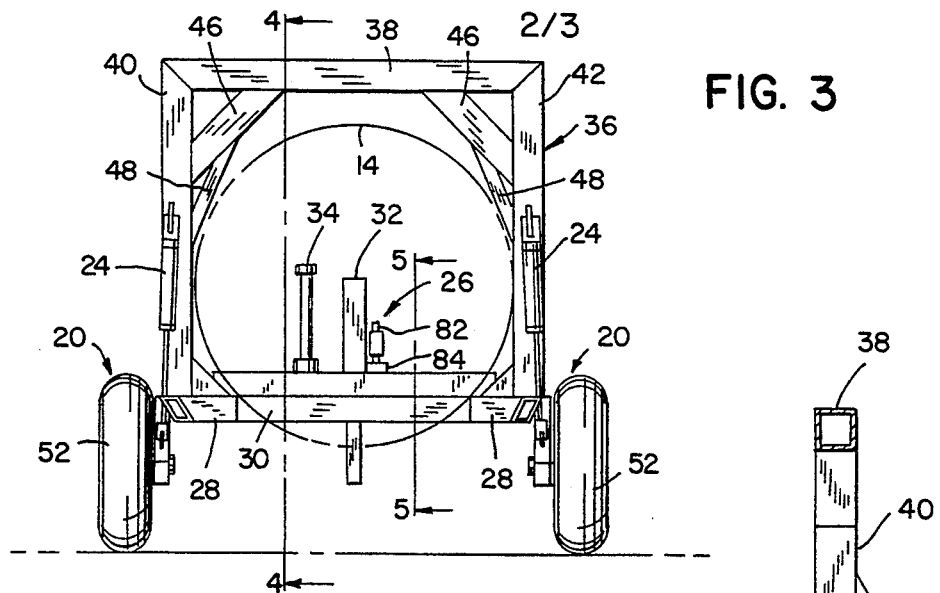
FIG. 3 is a rear end elevation of the bale handling carrier as viewed from the right hand of FIG. 1.

Referring to FIGS. 1-3, the bale handling carrier 10 of the present invention is an agricultural implement adapted to be hitched to a towing vehicle 12, such as a conventional farm tractor, for handling large, round or cylindrical bales 14 of harvested hay lying on their sides on a field or ground surface 16, and for transporting the bales 14 to an unloading site. Carrier 10 is a trailer-like construction suitably comprising a support structure 18, wheel assemblies 20, a plurality of power mechanisms 22, 24, and a control arrangement 26, therefor, all of which will be described in further detail hereafter.

Support structure 18 includes a pair of elongated, fixed parallel boom members 28 for supporting a series of cylindrical bales 14 in cradled fashion and in end-to-end relationship substantially along the entire length of boom members 28. The forward end of support structure 18 is interconnected by a transverse cross brace 30 adapted to be attached to tractor 12. A support stanchion 32 extends upwardly from cross brace 30 and is flanked by a conventional parking jack 34. Boom members 28 and cross brace 30 are preferably welded together and fabricated from metal beams or the like designed to bear the bale weight without deformation. The rearward ends of boom members 28 are somewhat tapered and diverge outwardly from one another as shown in FIG. 3, to facilitate engagement with bales 14 as will be understood.

Adding structural stability to support structure 18 is a singular arch-like, generally U-shaped inverted frame 36 located toward the rear of carrier 10 above a bale receiving area. Frame 36 has a top member 38 disposed above the uppermost level of bales 14, supported on boom members 28 and left-hand and right-hand side members 40, 42, respectively, extending downwardly from top member 38 for substantially orthogonal or upright connection with each boom member 28. A support strut 44 extends between each side member 40, 42 and each respective boom member 28 to lend further stability to frame 36. In addition, reinforcing braces 46, 48 are provided between top member 36 and side members 40, 42 to strengthen frame 36. Again, it is contemplated that all components of frame 36 are fashioned of rigid metal which will easily sustain the stresses of weighty bales 14.

Support structure 18 is equipped with transport devices or wheel assemblies 20 to enable conveyance over ground or field surface 16. In the preferred embodiment, it is desirable that wheel assemblies 20 comprise single wheel assemblies, each having one wheel 52 on each side of support structure 18. A lever arm 54 has one end pivotally connected to boom member 28 adjacent the bottom end of each respective side member 40, 42, and another end rotatably fastened to each respective wheel 52. By this construction, wheel assemblies 20 are joined to each of boom members 28 through lever arms 54. It will be appreciated that, depending on the orientation of lever arms 54 relative to support structure 18, support structure 18 will be disposed substantially above or below the height of wheel assemblies 20.

Connection means is provided for hitching support structure 18 to towing vehicle 12 comprising a tongue 56 extending between cross brace 30 and a hitch 58 on vehicle 12. Tongue 56 is a one-piece, angled, metallic member, having a first leg 60 extending substantially parallel to boom members 28 and a second leg 62 extending upwardly and rearwardly from first leg 60 when support structure 18 is in a raised position, such as depicted in FIG. 1. The end of first leo 60 is connected about a horizontal pivot 64 to hitch 58, while the end of second leg 62 is connected about a horizontal pivot 66 to facilitate upward and downward movement of the forward end of support structure 18, as seen in FIGS. and 2. Hitch 58 comprises a vertical pivot 68 by means of which support structure 18 may swing left or right, or assume a position in line with towing vehicle 12.

Figure 4:
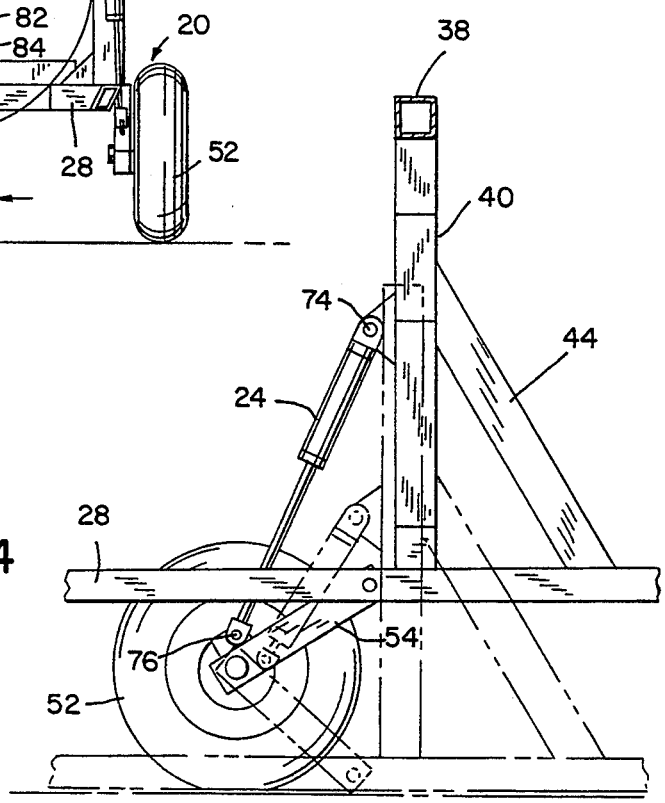
FIG. 4 is a cross-sectional view taken on line 4—4 in FIG. 3 showing in phantom certain elements of the carrier frame in a lowered position.
Figure 5:
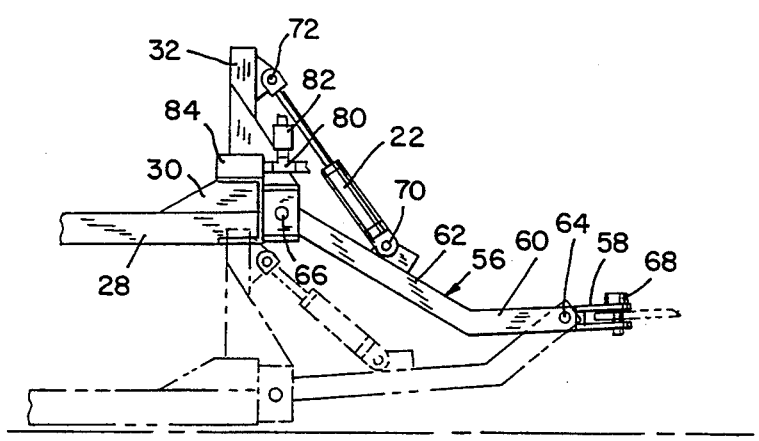
FIG. 5 is a cross-sectional view taken on line 5—5 in FIG. 3 showing in phantom other elements of the carrier frame in a lowered position.

In order to operate support structure 18 between lowered and raised positions, fluid power mechanisms 22, 24 are employed. A first provision comprises a single hydraulic cylinder 22 having a cylinder end 70 pivotally connected to a mid-portion of second leg 62 of tongue 56, and a piston rod end 72 pivotally connected to the upper part of stanchion 32. As best seen in FIG. 5, this arrangement of power mechanism and pivot points ensures that retraction of cylinder 22 will properly lower the forward end of support structure 18 to ground 16. A second provision comprises a pair of hydraulic cylinders 24, one of each being used to pivot wheel assembly 20. Each cylinder 24 has a cylinder end 74 pivotally connected to a mid-portion of side member 40, 42 of U-shaped frame 36 and a piston rod end 76 pivotally connected to a hub portion of wheel 52. In conjunction with lever arm 54, retraction of cylinder 24 as shown in phantom in FIG. 4, will cause support structure 18 to lower to ground 16 as each wheel 52 shifts upwardly.

Figure 6:
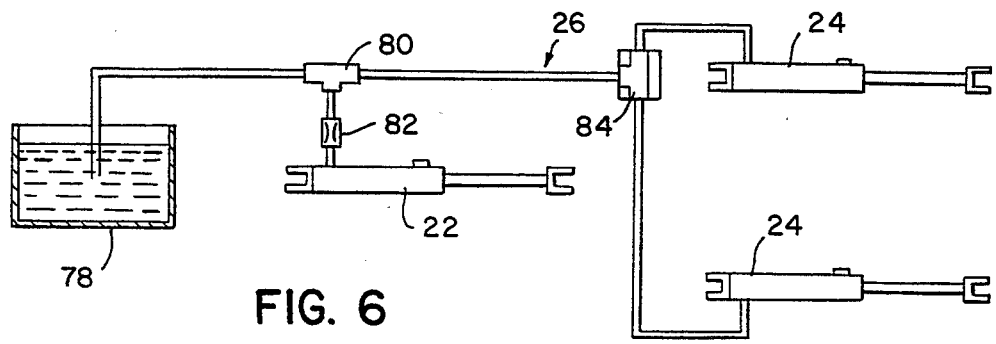
FIG. 6 is a simplified diagram of the hydraulic circuit used in the present invention.

As a salient feature of the invention, fluid power mechanisms (cylinders) 22, 24 are adapted to be powered by a fluid control arrangement 26, illustrated in FIGS. 5 and 6, having a fluid source 78 on towing vehicle 12 connected to cylinders 22, 24 via hydraulic hose lines and accompanying hose couplings. Fluid is supplied to a T-coupling 80 such that one path of fluid is fed to a manually adjustable flow control valve 82 for regulating the speed of extension and retraction of cylinder 22 to raise and lower the forward end of support structure 18. A second path of fluid is channeled to a flow divider 84, which automatically and equally apportions correct flow of fluid to each of cylinders 24 so as to smoothly and evenly raise and lower the rearward portion of support frame 18. Cylinders 22, 24 are thus interconnected for conjoint operation by an operation of towing vehicle 12 in order to raise and lower the entire support structure 18 as desired. It should be appreciated that the main components of this fluid control arrangement 26 are accessibly mounted adjacent cross brace 30 on the forward end of support structure 18 within sight of and a short distance from the operator, should adjustment or service be required.

In operation, carrier 10 is normally drawn to and from a field directly behind towing vehicle 12. Loading is accomplished by aligning the rearward end of boom members 28 with an end of a bale 14 and lowering support frame 18 to ground 16 by retracting cylinders 22, 24, as shown in FIG. 2. This is simply effected by relieving the pressure at source 78 so that the weight of carrier 10 will enable the retraction of cylinders 22, 24. Tow vehicle 12 is then driven in reverse, causing the outwardly diverging ends of boom members 28 to slide under curved surfaces of bale 14 while bale 14 rests on ground 16. Cylinder 22 is then actuated to first raise the forward end of support frame 18 and then subsequently cylinders 24 are operated to raise the rearward end of structure 18, causing bale 14 to be elevated while its curved sides rest on boom members 28.

Figure 7A:
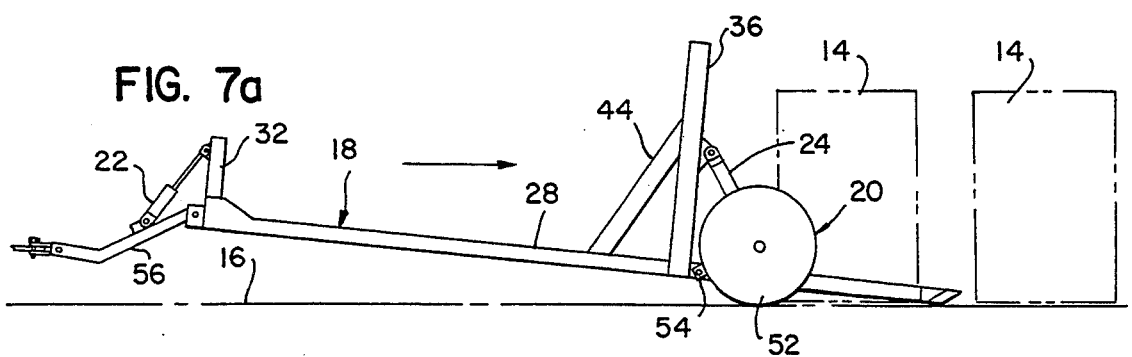
FIGS. 7a through 7c are views in side elevation of the bale handling carrier embodying the invention operation through successive moves from an initial engagement with the first hay bale to a loading operation of a second hay bale.
Figure 7B:
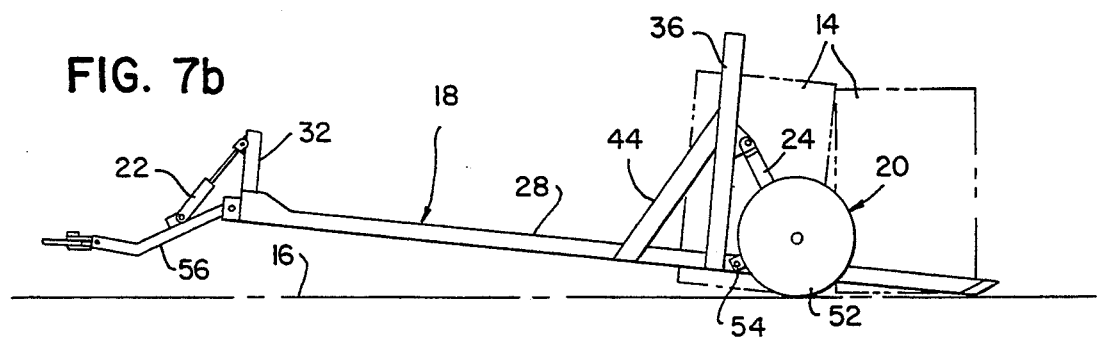
Figure 7C:
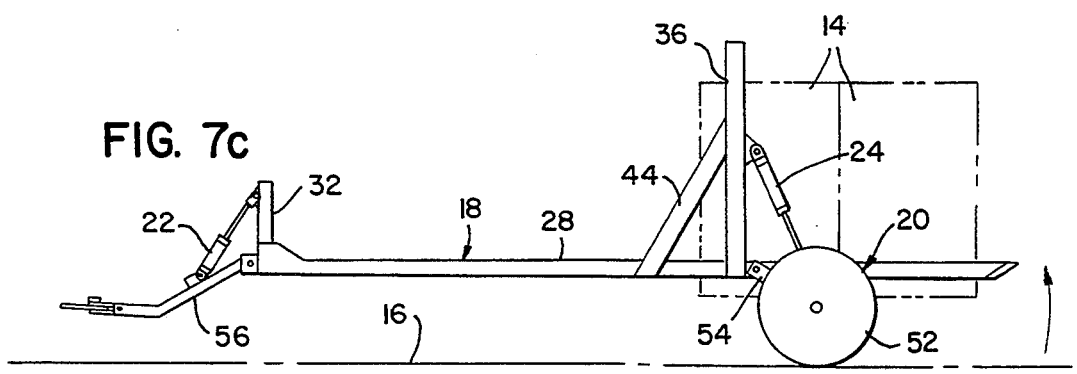

A second bale 14 is retrieved, as shown in FIGS. 7a-7c, by retracting cylinders 24 to lower only the rearward end of structure 18, after which vehicle 12 is again reversed to engage a second bale 14, which pushes initial bale 14 forward through frame 36. Cylinders 24 are then actuated to raise the rearward end of structure 18. Subsequent bales 14 are loaded in similar fashion until the end of initial bale 14 engages an inclined face of cross brace 30, defining a forward stop limit for bales 14, at which point full capacity is attained (FIG. 1). Loaded carrier 10 is then towed to a storage site where cylinders 22 and 24 are retracted to lower the forward and rearward ends of structure 18 and vehicle 12 is advanced to disengage boom members 28 from contact with bales 14, which are left in a close formation on ground 16 for further retrieval or storage, as desired.

It should be recognized that the present invention enhances the handling of cylindrical bales 14 by provision of a mobile support frame 18, raised and lowered advantageously by design of carrier pivot points and accessible inclusion of a fluid control arrangement which provides smooth, even and continuous loading and unloading. The bale handling carrier 10 is of relatively simple and economical construction, which operates without any complicated power take off requirements. Unlike the prior art, the present system is independent of separate boom member actuators, telescopic lifting assemblies or complex hitches to the towing vehicle.

While the invention has been described with reference to a preferred embodiment, those skilled in the art will appreciate that certain substitutions, alterations, and omissions may be made without departing from the spirit hereof. Accordingly, the foregoing description is meant to be exemplary only and should not be deemed limitative on the scope of the invention set forth in the accompanying claims.

I claim:

1. A carrier adapted to be drawn over the ground for handling and transporting cylindrical bales of hay, said carrier comprising:
   a rigid support structure having a forward and adapted to be connected to a towing vehicle and a rearward end adapted to be engaged with said cylindrical bales for supporting a series of said cylindrical bales in end-to-end relationship substantially along the length thereof;
   said support structure including a pair of parallel bale engaging members having a fixed spacing therebetween;
   a generally U-shaped inverted frame extending upwardly from said support structure in fixed relationship thereto;
   a wheel assembly on each side of said support structure spaced a fixed distance from each other and pivotally connected thereto adjacent said U-shaped frame;
   a fluid power mechanism disposed on each side of said support structure for moving said support structure upwardly and downwardly relative to said wheel assemblies and the ground; and
   a fluid control arrangement including an automatic equalizer valve operably connected with each of said fluid power mechanisms and accessibly mounted on said forward end of said support structure, said fluid control arrangement being adapted to equally and automatically supporting the flow of fluid to each of said fluid power mechanisms such that said support structure is smoothly and evenly raised and lowered during handling of said cylindrical bales.

2. The carrier as recited in claim 1, including a further fluid power mechanism disposed on the forward end of said support structure for raising and lowering the forward end thereof.

3. The carrier as recited in claim 2, wherein said fluid control arrangement further comprises a manually controllable fluid control valve operatively connected with said further fluid power mechanism located on the forward end of said support structure.

4. The carrier as recited in claim 1, including a one-piece tongue, having one end pivotally connected to the forward end of said support structure and another end pivotally connected to said towing vehicle.

5. The carrier as recited in claim 2, wherein each of said fluid power mechanisms and said further fluid power mechanism each comprises an extendable and retractable hydraulic cylinder.

6. The carrier as recited in claim 5, wherein each of said fluid power mechanisms and said further fluid power mechanism is retractable to lower said support structure substantially to the ground.

7. The carrier as recited in claim 5, wherein each of said fluid power mechanisms and said further fluid power mechanism is extendable to raise said support structure to an elevated level substantially parallel to the ground.

8. The carrier as recited in claim 4, wherein the forward end of said support frame includes a support stanchion, said further fluid power mechanism being mounted between said support stanchion and said tongue.

9. The carrier as recited in claim 1, wherein each of said wheel assemblies includes a lever arm having one end pivotally connected to said support frame and another end rotatably connected to said wheel assembly.

10. The carrier as recited in claim 1, wherein each of said fluid power mechanisms has one end connected to a mid portion of said U-shaped support frame and another end connected to said wheel assembly.

11. A carrier adapted to be drawn over the ground by a towing vehicle for handling and transporting cylindrical bales of hay, said carrier comprising:
   a support means having a single pair of elongated, parallel boom members having a fixed spacing therebetween for supporting a series of cylindrical bales cradled on said boom members in end-to-end series relationship substantially along the length thereof;

a cross brace joining said boom members together at a forward end of said support means adapted for attachment to the towing vehicle;

a generally U-shaped inverted frame above a bale receiving area of the carrier having a top member and side members extending downwardly, each side member being connected in an upright attitude to one of said boom members, a support strut extending respectively between each of said side members and each of said boom members;

transport means on each side of said support means spaced a fixed distance from each other and pivotally connected to each of said boom members adjacent the bottom of each of said side members;

connection means for hitching said cross brace to said towing vehicle;

first power means mounted on said connection means for raising and lowering the forward end of the support means including said cross brace;

a second power means extending respectively between each of said side members and each of said transport means for raising and lowering said support means relative to said transport means and the ground, and a control means accessibly mounted on said cross brace for coordinating the operation of said first power means and said second power means.

12. The carrier as recited in claim 11, including a parking jack movably mounted on said cross brace.

13. The carrier as recited in claim 11, wherein said cross brace includes an inclined face defining a forward stop limit for said cylindrical bales.

14. The carrier as recited in claim 11, wherein said connection means comprises a one-piece, angled tongue having a first leg substantially parallel to said boom members and a second leg extending upwardly and rearwardly of said first leg when said support means is in a raised position.

15. A carrier adapted to be drawn over the ground for handling and transporting cylindrical bales of hay, said carrier comprising:

a rigid support structure having a forward end adapted to be connected to a towing vehicle and a rearward end adapted to be engaged with said cylindrical bales for supporting a series of said cylindrical bales in end-to-end relationship substantially along the length thereof;

a generally U-shaped inverted frame extending upwardly from said support structure;

a wheel assembly on each side of said support structure pivotally connected thereto adjacent said U-shaped frame;

a fluid power mechanism disposed on each side of said support structure for moving said support structures upwardly and downwardly relative to said wheel assemblies and the ground;

a further fluid power mechanism disposed on the forward end of said support structure for raising and lowering the forward end thereof; and a fluid control arrangement accessibly mounted on said forward end of said support structure and adapted for equally and automatically apportioning the flow of fluid to each of said fluid power mechanisms located on each side of said support structure such that said support structure is smoothly and evenly raised and lowered during handling of said cylindrical bales;

said fluid control arrangement comprising an automatic equalizer valve operatively connected with each of said fluid power mechanisms located on each side of said support structure and a manually controllable fluid control valve operatively connected with said further fluid power mechanism located on the forward end of said support structure.

* * * * *

UNITED STATES PATENT AND TRADEMARK OFFICE
CERTIFICATE OF CORRECTION

PATENT NO. : 5,362,189
DATED : November 8, 1994
INVENTOR(S) : MICHAEL J. LINDAHL It is certified that error appears in the above-identified patent and that said Letters Patent is hereby corrected as shown below:

<u>In The Claims</u>

CLAIM 1, Col. 6, Line 14, delete "to" and substitute therefor -- for --; CLAIM 1, Col. 6, Line 14, delete "supporting" and substitute therefor -- apportioning --; CLAIM 11, Col. 7, Line 17, before "first" insert -- a --.

Signed and Sealed this

Thirty-first Day of January, 1995

BRUCE LEHMAN

Attest:

*Attesting Officer*          *Commissioner of Patents and Trademarks*